United States Patent
Kim et al.

(10) Patent No.: US 8,165,602 B2
(45) Date of Patent: Apr. 24, 2012

(54) SYSTEM AND METHOD FOR PROVIDING LOCATION BASED SERVICES IN A MOBILE COMMUNICATION SYSTEM

(75) Inventors: Jun-Hyung Kim, Suwon-si (KR); Ji-Cheol Lee, Yongin-si (KR); Jung-Shin Park, Seoul (KR); Nae-Hyun Lim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 994 days.

(21) Appl. No.: 11/925,561

(22) Filed: Oct. 26, 2007

(65) Prior Publication Data

US 2009/0054082 A1    Feb. 26, 2009

(30) Foreign Application Priority Data

Aug. 20, 2007  (KR) .............................. 10-2007-83701

(51) Int. Cl.
*H04W 24/00* (2009.01)
(52) U.S. Cl. .................. 455/456.2; 455/404.2; 455/433; 455/440; 455/456.1; 455/456.5
(58) Field of Classification Search ............... 455/456.2, 455/456.1, 426.1, 426.2, 456.6
See application file for complete search history.

(56) References Cited

U.S. PATENT DOCUMENTS

| | | | |
|---|---|---|---|
| 7,920,521 B2* | 4/2011 | Xiang et al. ................... | 370/331 |
| 2004/0203914 A1* | 10/2004 | Kall et al. ................... | 455/456.1 |
| 2005/0272440 A1* | 12/2005 | Li ............................... | 455/456.1 |
| 2008/0214213 A1* | 9/2008 | Etemad et al. ............. | 455/456.6 |
| 2010/0106806 A1* | 4/2010 | Xie et al. ...................... | 709/219 |

* cited by examiner

*Primary Examiner* — Anthony Addy
*Assistant Examiner* — Shahriar Behnamian
(74) *Attorney, Agent, or Firm* — The Farrell Law Firm, P.C.

(57) ABSTRACT

In a method for providing Location Based Services (LBS) in a mobile communication system, upon receipt of a location trigger at an LS for requesting location information of an MS from a location client, the LS transmits an authentication request message for requesting an ID of an Anchor Authenticator (AA) for the MS to an Authorization, Authentication and Accounting server (AAA), which transmits an authentication response message to the LS. The LS transmits an LCID request message for requesting an LCID of an LC for the MS to the AA, which AA transmits an initiate MS paging request message to an APC. The APC detects a serving LC of the MS and transmits an LCID to the AA, which transmits an LCID response message to the LS, which transmits an MS location report request message to the serving LC. The LC transmits an MS location report response message to the LS.

5 Claims, 2 Drawing Sheets

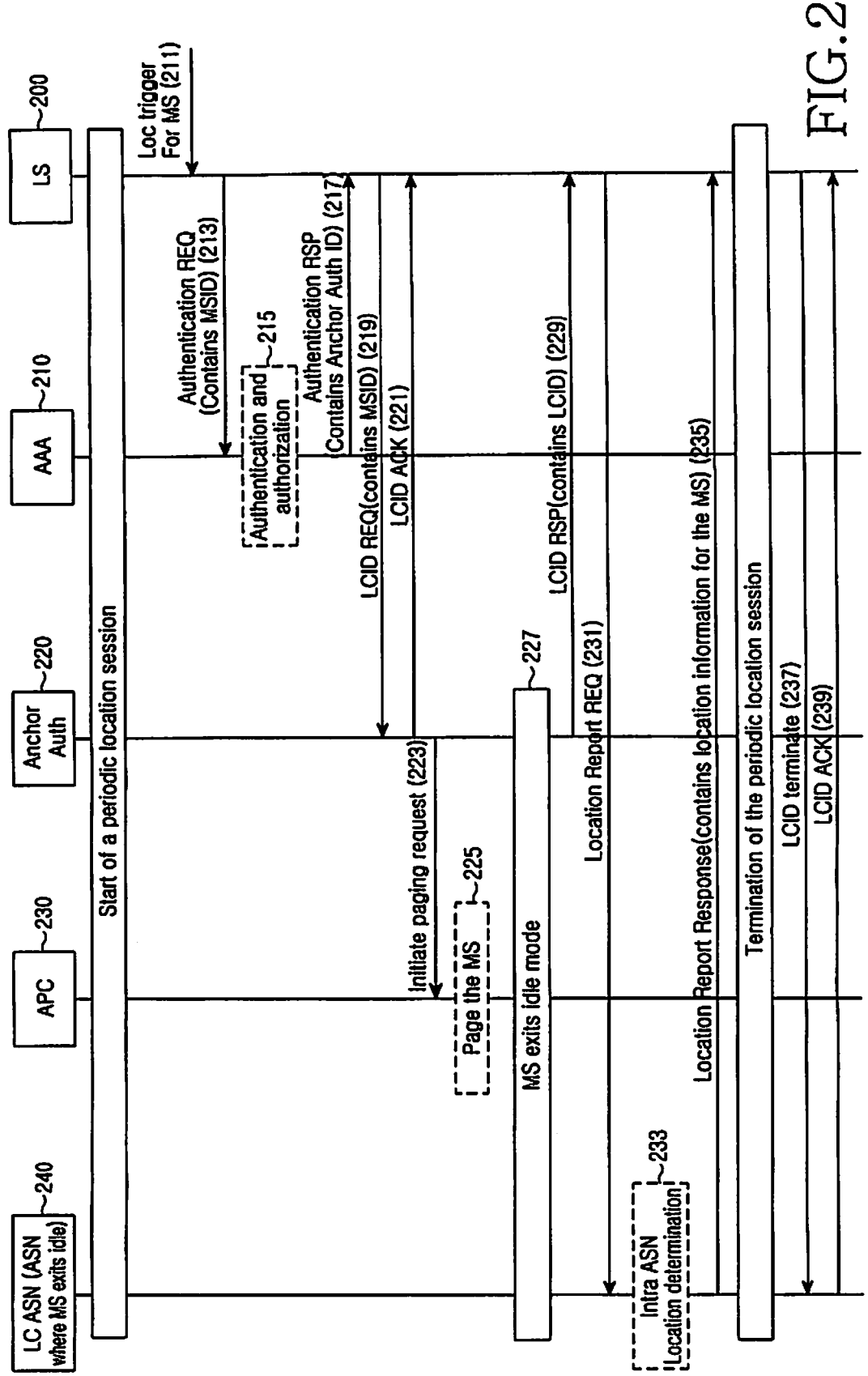

SYSTEM AND METHOD FOR PROVIDING LOCATION BASED SERVICES IN A MOBILE COMMUNICATION SYSTEM

PRIORITY

This application claims priority under 35 U.S.C. §119(a) to a Korean Patent Application filed in the Korean Intellectual Property Office on Aug. 20, 2007 and assigned Serial No. 2007-83701, the contents of which are incorporated herein by reference.

BACKGROUND OF THE INVENTION

1. Field of the Invention

The present invention relates generally to a system and method for providing Location Based Services (LBS) in a mobile communication system.

2. Description of the Related Art

Mobile communication systems are evolving into advanced systems that provide various value-added services in addition to the existing voice services. In the current mobile communication market, voice service-based service providers have reached a profit limit. Therefore, service providers now pursue profits by providing various value-added services differentiated from the voice service, such as, for example, LBS which are based on location information of a Mobile Station (MS). For example, typical LBS include friend-finding, location-finding and car navigation services.

With the development of mobile communication systems, the services provided in a mobile communication system are diversified requiring high-speed transmission/reception of high-volume data to increase its performance. In current mobile communication systems, active research is being conducted on various standards to transmit/receive high-volume data at high speed. One such standard, the Worldwide Interoperability for Microwave Access (WiMAX) Forum Network Working Group standard, is now undergoing standardization.

There is currently an increase in user demand for LBS; however, no detailed scheme for providing the LBS has been proposed in the WiMAX Forum Network Working Group standard. Therefore, a scheme is needed for providing the LBS in a mobile communication system using the WiMAX Forum Network Working Group standard.

SUMMARY OF THE INVENTION

The present invention has been made to address at least the above problems and/or disadvantages and to provide at least the advantages described below. Accordingly, an aspect of the present invention provides a system and a method for providing LBS in a mobile communication system.

According to the present invention, there is provided a method for providing LBS in a mobile communication system. The method includes, upon receipt of a location trigger at a Location Server (LS) for requesting location information of an MS from a location client, transmitting an authentication request message for requesting an IDentifier (ID) of an anchor authenticator for the MS from the LS to an Authorization, Authentication and Accounting server (AAA), upon receipt of the authentication request message at the AAA, transmitting an authentication response message including an ID of the anchor authenticator from the AAA to the LS, upon receipt of the authentication response message at the LS, transmitting a Location Controller Identifier (LCID) request message for requesting an LCID of a Location Controller (LC) for the MS from the LS to the anchor authenticator, upon receipt of the LCID request message at the anchor authenticator, transmitting an initiate paging request message from the anchor authenticator to an Anchor Paging Controller (APC) to initiate a paging operation for the MS when the MS is in an idle mode, upon receipt of the initiate paging request message at the APC, detecting by the APC a serving LC of the MS by paging the MS and transmitting an LCID of the serving LC from the APC to the anchor authenticator, upon receipt of the LCID of the serving LC at the anchor authenticator, transmitting an LCID response message including an LCID of the serving LC from the anchor authenticator to the LS, upon receipt of the LCID response message at the LS, transmitting a location report request message for requesting a report on location information of the MS from the LS to the serving LC, and upon receipt of the location report request message at the LC, transmitting a location report response message including location information of the MS from the LC to the LS.

According to the present invention, there is provided a method for providing LBS by an LS in a mobile communication system. The method includes, upon receipt of a location trigger for requesting location information of an MS from a location client, transmitting an authentication request message for requesting an ID of an anchor authenticator for the MS to an AAA server, after transmitting the authentication request message, receiving an authentication response message including an ID of the anchor authenticator from the AAA, upon receipt of the authentication response message, transmitting to the anchor authenticator an LCID request message for requesting an LCID of a serving Location Controller (LC) for the MS, after transmitting the LCID request message, receiving an LCID response message including an LCID of the serving LC from the anchor authenticator, upon receipt of the LCID response message, transmitting to the serving LC a location report request message for requesting a report on location information of the MS, and after transmitting the location report request message, receiving a location report response message including location information of the MS from the serving LC.

According to the present invention, there is provided a method for providing LBS by an anchor authenticator in a mobile communication system. The method includes, receiving from an LS an LCID request message for requesting an LCID of a serving Location Controller (LC) for an MS, and upon receipt of the LCID request message, transmitting an initiate paging request message to an Anchor Paging Controller (APC) initiate a paging operation for the MS, after transmitting the initiate paging request message, receiving an LCID of the serving LC from the APC, and transmitting an LCID response message including an LCID of the serving LC to the LS, wherein the MS's location information is required according to a location trigger of a location client.

According to the present invention, there is provided a method for providing LBS by an APC in a mobile communication system. The method includes, receiving an initiate paging request message from an anchor authenticator to initiate a paging operation for an MS, and upon receipt of the initiate paging request message, detecting a serving LC of the MS by paging the MS and transmitting an LCID of the serving LC to the anchor authenticator.

According to the present invention, there is provided a system for providing LBS in a mobile communication system. The system includes, a Location Server (LS) for receiving a location trigger for requesting location information of a Mobile Station (MS) from a location client, transmitting an authentication request message for requesting an identifier (ID) of an anchor authenticator for the MS to an Authorization, Authentication and Accounting server (AAA), receiving an authentication response message from the AAA, transmitting a Location Controller Identifier (LCID) request message for requesting an LCID of a Location Controller (LC) for the MS to the anchor authenticator, receiving an LCID response message, transmitting a location report request message for requesting a report on location information of the MS to the serving LC, and receiving a location report response message including location information of the MS from the serving LC, the AAA for receiving the authentication request message from the LS, and transmitting the authentication response message including an ID of the anchor authenticator to the LS, the anchor authenticator for receiving the LCID request message, and transmitting an initiate paging request message to an Anchor Paging Controller (APC) to initiate a paging operation for the MS when the MS is in an idle mode, the APC for receiving the initiate paging request message, detecting a serving LC of the MS by paging the MS and transmitting an LCID of the serving LC to the anchor authenticator and the serving LC for receiving the location report request message and transmitting a location report response message including location information of the MS to the LS.

BRIEF DESCRIPTION OF THE DRAWINGS

The above and other aspects, features and advantages of the present invention will become more apparent from the following detailed description when taken in conjunction with the accompanying drawings, in which:

FIG. 2 illustrates a process of determining a serving LC of an MS in an idle mode in an LBS provisioning system according to the present invention.

DETAILED DESCRIPTION OF THE PREFERRED EMBODIMENTS

Figure 1:
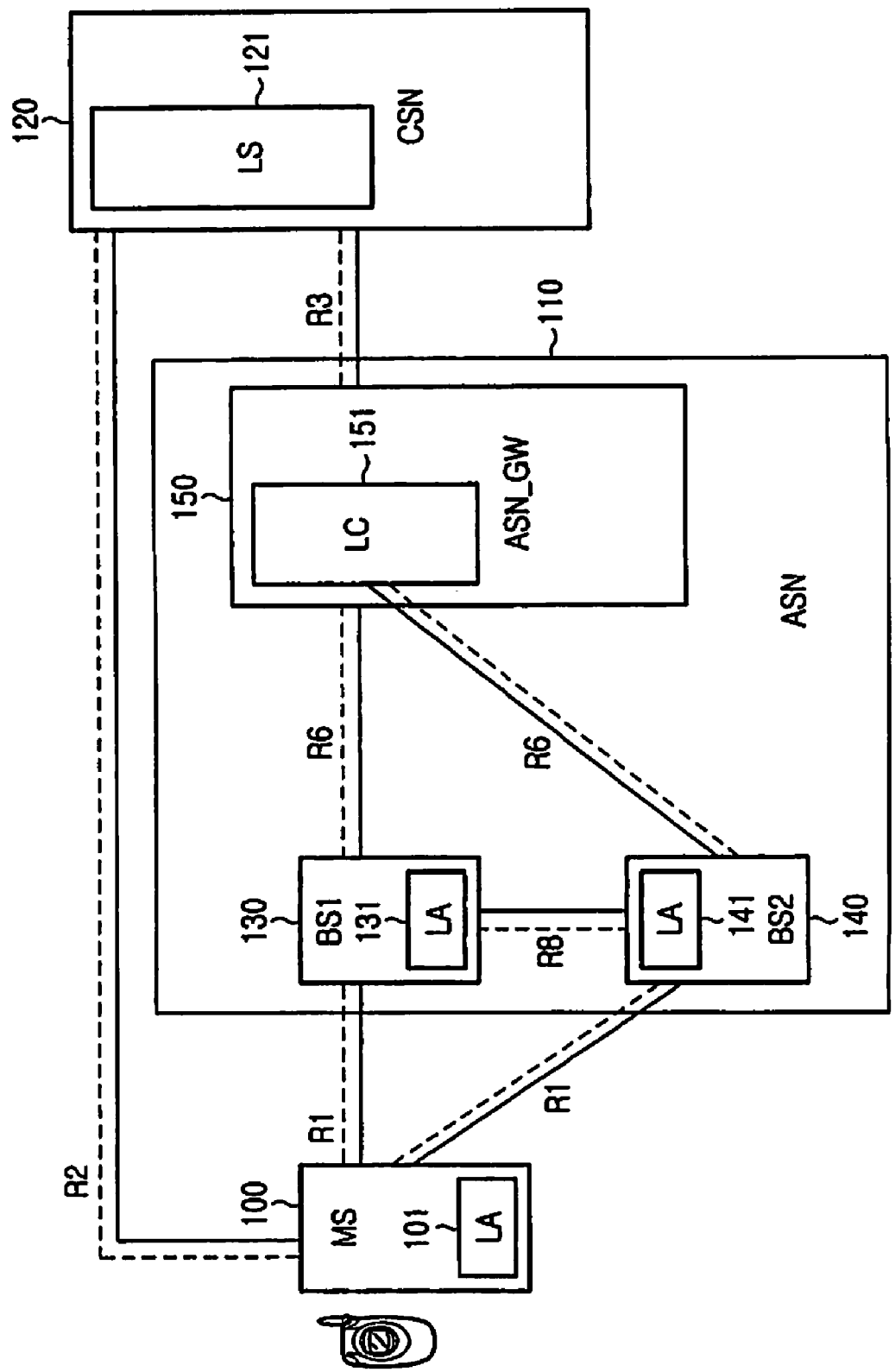
FIG. 1 illustrates a configuration of an LBS provisioning system according to the present invention.

Preferred embodiments of the present invention are described in detail with reference to the annexed drawings. Detailed descriptions of constructions or processes known in the art may be omitted for the sake of clarity and conciseness.

The present invention provides a system and method for providing LBS in a mobile communication system. Although the present invention will be described herein with reference to the mobile communication system using the WiMAX Forum Network Working Group standard, by way of example, it is not intended to limit the present invention thereto.

FIG. 1 illustrates a configuration of an LBS provisioning system according to the present invention.

Referring to FIG. 1, the LBS provisioning system includes an MS 100, an Access Services Network (ASN) 110 and a Connectivity Services Network (CSN) 120. The ASN 110 includes a first Base Station (BS1) 130, a second Base Station (BS2) 140 and an ASN Gateway (ASN_GW) 150. An interface scheme between the MS 100 and the BS1 130 and BS2 140 is an R1 interface scheme. An interface scheme between the MS 100 and the CSN 120 is an R2 interface scheme. An interface scheme between the ASN_GW 150 and the CSN 120 is an R3 interface scheme. An interface scheme between the BS1 130 and the ASN_GW 150 and between the BS2 140 and the ASN_GW 150 is an R6 interface scheme. An interface scheme between the BS1 130 and the BS2 140 is an R8 interface scheme. The R1, R2, R3, R6 and R8 interface schemes are not directly related to the present invention, so a detailed description thereof will be omitted herein.

The CSN 120 includes an LS 121, which provides location information of the MS 100 to internal authorized entities of an operator network, or external authorized entities of the operator network. Herein, the operator uses the WiMAX Forum Network Working Group standard (WiMAX network), and the authorized entity has the authority to request location information of the MS 100, for example, an LBS client. Further, the internal LBS client exists inside the WiMAX network, and the external LBS client exists outside the WiMAX network.

The ASN_GW 150 includes an LC 151, which triggers a network initiated LBS process when there is an inquiry request from the exterior. More specifically, the LC 151 triggers the network initiated LBS process upon receipt of an external inquiry request for location information of the MS 100. The LS 121 stores an ID of an LC 151, connected to a serving ASN 110, of the MS 100. Herein, the LC included in the serving ASN is a serving LC, and is thus a serving LC of the MS 100. The LS 121 calculates a location of the MS 100 using a location measurement result on the MS 100, transmitted by the LC 151.

The LC 151, in association with the BS1 130 and the BS2 140, determines location information of the MS 100, or determines a location parameter of the MS 100. The LC 151 provides the location information of the MS 100 or the location parameter of the MS 100 to the LS 121 or the MS 100. Further, the LC 151 can provide the location information of the MS 100 or the location parameter of the MS 100 to other internal entities included in the ASN 110, such as a Radio Resource Management (RRM) entity and a Mobility Management (MM) entity. The RRM entity and MM entity are not separately shown in FIG. 1. Upon receipt of a request for location information or a location parameter of the MS 100 from the MS 100 and the LS 121 or other entities included in the ASN 110, the LC 151 triggers location measurement on the MS 100 and collects all data necessary for location decision on the MS 100. The LC 151 previously knows a serving BS of the MS 100, and provides information on the serving BS of the MS 100 to the LS 121.

A Location Agent (LA) performs location measurement, or selectively collects the data necessary for location decision. The LA provides location-related data to the LC 151. Herein, the LA can be included in the MS 100 (LA 101), the BS1 130 (LA 131) and the BS2 140 (LA 141). When an LA is disposed in the MS, an LA corresponding thereto is disposed in the BS.

Although not illustrated in FIG. 1, the CSN 120 includes an AAA, which manages an anchor authenticator's ID of the MS 100. The anchor authenticator manages an ID of the serving LC of the MS 100, and is included in the ASN 110. In particular, the anchor authenticator can be located either inside or outside the ASN_GW 150 in the ASN 110. For convenience, it will be assumed herein that the anchor authenticator is located outside the ASN_GW 150.

Also, the ASN 110 includes a Paging Controller (PC), which also can be located either inside or outside the ASN_GW 150. For convenience, it will be assumed herein that the PC is located outside the ASN_GW 150.

FIG. 2 illustrates a process of determining a serving LC of an MS in an idle mode in an LBS provisioning system according to the present invention.

Before a description of FIG. 2 is given, a brief description will be made of a process of determining a serving LC of an MS in an idle mode in an LBS provisioning system according to the present invention. To determine a location of an MS, an LS should first determine an effective LC (i.e. serving LC) of the MS. A process in which the LS determines an LCID of the serving LC includes the following push and pull components.

(1) LC_ID Pull

To start a periodic or an aperiodic location information request for an MS, the LS determines an LCID of the serving LC through a process with an AAA. The term 'periodic location information request' as used herein refers to an action in which the serving LC requests the LS to periodically report the location information of the MS. The term 'aperiodic location information request' refers to an action in which the serving LC requests the LS to report the location information of the MS aperiodically, i.e. on a one-time basis.

(2) LC_ID Push

In some cases, when the LS transmits a request for periodic location information to the serving LC, the LCID is transferred to the LS while periodically providing the location information of the MS to the LS. For example, an LC in an ASN in which the MS in the idle mode is located updates an LS when the idle mode is terminated. While the idle mode termination process, a location context is transferred using a Type/Length/Value (TLV).

When the LS intends to terminate the periodic location information request, it can terminate the LCID update at the LS through the LC_ID push by transmitting an LCID terminate message to a current LC.

Referring to FIG. 2, an LS 200 receives a location trigger for requesting location information of an MS (not shown) from a location client (Loc trigger for MS) in step 211. The location client refers to an entity for requesting location information of an MS, and can be disposed either inside or outside the WiMAX network. The location client disposed inside the WiMAX network is the internal authorized entity, while the location client disposed outside the WiMAX network is the external authorized entity, both of which are described in FIG. 1. Upon receipt of the location trigger, the LS 200 transmits an Authentication REQuest (Authentication REQ) message to an AAA 210 (Authentication REQ (Contains MSID)) in step 213. The Authentication REQ message, for requesting an anchor authenticator identifier for the MS, includes an ID (i.e. MSID) of the MS, location information of which the LS 200 intends to acquire. Also, although not illustrated in FIG. 2, the Authentication REQ message can include an ID of the location client. Upon receiving the Authentication REQ message, the AAA 210 performs an authentication and authorization operation using the MSID included in the Authentication REQ message (Authentication and authorization) in step 215. The authentication operation refers to an operation of determining whether the location client has a qualification to request the location information of the MS, and the authorization operation indicates an operation of determining whether it is possible to open the location information of the MS to the location client.

After successfully performing the authentication and authorization operation, the AAA 210 transmits an Authentication ReSPonse (Authentication RSP) message to the LS 200 (Authentication RSP (Contains Anchor Auth ID)) in step 217. Herein, the Authentication RSP message, a response message to the Authentication REQ message, includes an anchor authenticator ID of the MS. Although not shown in FIG. 2, as a result of the authentication and authorization operation performed by the AAA 210, if the location client has no qualification to request the location information of the MS or it is not possible to open the location information of the MS to the location client, the AAA 210 transmits the information indicating the failure in the authentication and authorization operation to the LS 200 along with the Authentication RSP message. Then the LS 200 transmits a notification indicating the failure in the location trigger to the location client. Although the AAA 210 performs the authentication and authorization operation in FIG. 2, by way of example, the AAA 210 can omit the authentication and authorization when necessary. Upon receipt of the Authentication RSP message, the LS 200 can detect an anchor authenticator ID of the MS from the received Authentication RSP message. Therefore, the LS 200 transmits an LCID REQuest (LCID REQ) message to an anchor authenticator (i.e. anchor authenticator 220) corresponding to the anchor authenticator ID (LCID REQ (Contains MSID)) in step 219. The LCID REQ message, for requesting an LCID for a serving LC of the MS, includes an MSID of the MS.

After receiving the LCID REQ message, the anchor authenticator 220 transmits an LCID ACKnowledgement (LCID ACK) message to the LS 200 in step 221. The LCID ACK message represents that the anchor authenticator 220 received the LCID REQ message normally. Herein, the anchor authenticator 220 knows whether the MS is in an idle mode or an awake mode because the anchor authenticator 220 manages an operation mode of the MS. In the present invention, it will be assumed that the MS is in an idle mode, so the anchor authenticator 220 generates the LCID ACK message including an information representing that the MS is in an idle mode. After transmitting the LCID ACK message, the anchor authenticator 220 transmits an Initiate paging request message to an APC 230 to initiate a paging operation for the MS in step 223.

After receiving the Initiate paging request message, the APC 230 pages the MS (Page the MS) in step 225. Although not illustrated in FIG. 2, an operation of the APC 230 for paging the MS will be described.

The APC 230 transmits a paging announce message to all ASN-GWs located in a paging zone managed by the APC 230. Herein, the paging announce message includes an MSID of the MS, and represents that the MS is paged. After receiving the paging announce message, each of all ASN-GWs transmits the paging announce message to all BSs connected to the each of all ASN-GWs. Therefore, an MS in an idle mode transitions to an awake mode, or performs a location update operation. Hence, the APC 230 knows a BS and an ASN-GW currently connected to the MS, and the anchor authenticator 220 knows the BS and the ASN-GW currently connected to the MS.

The MS exits an idle mode operation in ASN due to the paging (MS exits idle mode) in step 227. Herein, an ASN connected to the MS in the idle mode is identical or not identical to an ASN in which there is the APC 230, and is identical or not identical to an ASN in which there is an ADPF.

The anchor authenticator 220 transmits an LCID ReSPonse (LCID RSP) message to the LS 200 in step 229. The LCID RSP message includes an LCID for the serving LC.

Upon receipt of the LCID RSP message, the LS 200 can determine the serving LC of the MS. Therefore, the LS 200 transmits a Location Report Request message to the serving LC (i.e. serving LC 240) of the MS (Location Report Request (contains information such as MSID, periodicity and resolution) in step 231. It should be noted that the serving LC 240 is shown as an LC ASN (i.e., serving ASN) 240 in FIG. 2. The Location Report Request message, for requesting a report on location information for the MS, is assumed to include (i) an MSID of the MS, (ii) report period (periodicity) information indicating a report period by which location information of the MS is to be reported, and (iii) duration information indicating the total time interval for which the periodic report is to be performed. When the report period information is written as a preset value (e.g. '0'), it indicates that there is no need to periodically report the location information for the MS. It will be assumed that when the report period information is written as '0', the duration information is also written as a preset value (e.g. '0').

Upon receipt of the Location Report Request message, the serving LC 240 starts a location decision operation for the MS. That is, the serving LC 240 performs an intra-ASN procedure for location decision on the MS (intra ASN Location determination) in step 233. Thereafter, in step 235, the serving LC 240 transmits location information for the MS to the LS 200 along with a Location Report Response message (Location Report Response (contains location information for the MS)). When the report period information included in the Location Report Request message is not the set value, i.e. when the location information of the MS should be periodically reported, the serving LC 240 periodically transmits the Location Report Response message to the LS 200, until the MS leaves the serving LC 240, the duration included in the Location Report Request message expires, or the LS 200 determines to terminate a periodic location session. The term 'periodic location session' as used herein refers to a session in which the serving LC 240 periodically transmits the Location Report Response message to the LS 200.

When there is an intention to terminate the periodic location session (Termination of the periodic location session), the LS 200 transmits an LCID terminate message to the target LC 230 to prevent the serving LC 230 from any continued periodic reporting of the location information of the MS in step 237. Upon receipt of the LCID terminate message, the serving LC 230 transmits an LCID ACK message indicating the normal receipt of the LCID terminate message to the LS 200 in step 239.

As is apparent from the foregoing description, the present invention enables LBS provision in the mobile communication system employing the WiMAX Forum Network Working Group standard. Therefore, the present invention enables provisioning of various LBS-based services in the mobile communication system employing the WiMAX Forum Network Working Group standard, thereby giving service providers an opportunity for new profits, enabling the user to receive various LBS-based services, and thus contributing to popularization of the WiMAX service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing Location Based Services (LBS) in a mobile communication system, the method comprising the steps of:
    transmitting, upon receipt of a location trigger at a Location Server (LS) for requesting location information of a Mobile Station (MS) from a location client, an authentication request message for requesting an IDentifier (ID) of an anchor authenticator for the MS from the LS to an Authorization, Authentication and Accounting server (AAA);
    transmitting, upon receipt of the authentication request message at the AAA, an authentication response message including an ID of the anchor authenticator from the AAA to the LS;
    transmitting, upon receipt of the authentication response message at the LS, a location information request message for requesting location information of the MS from the LS to the anchor authenticator;
    transmitting, upon receipt of the location information request message at the anchor authenticator, an initiate paging request message from the anchor authenticator to an Anchor Paging Controller (APC) to initiate a paging operation for the MS when the MS is in an idle mode;
    detecting, by the APC, upon receipt of the initiate paging request message at the APC a serving Location Controller (LC) of the MS by paging the MS and transmitting a Location Controller IDentifier (LCID) of the serving LC from the APC to the anchor authenticator; and
    transmitting, a location response message including location information of the MS in response to the location information request message from the LC to the LS;
    wherein the MS is in an idle mode.

2. The method of claim 1, further comprising:
    transmitting a location information ACKnowledgement (ACK) message including information representing that the MS is in an idle mode from the anchor authenticator to the LS.

3. The method of claim 1, wherein the transmitting a location response message comprises:
    transmitting the location information of the MS to the LS along with the location response message at every report period for the total time interval using report period information indicating a report period by which the serving LC will report the location information of the MS and duration information indicating the total time interval for which the serving LC will periodically report the location information of the MS, wherein transmitting the location information is defined as a periodic location session process.

4. The method of claim 3, further comprising:
    determining a termination of performance of the periodic location session process at the LS, receiving a location information terminate message including information representing the termination of performance of the periodic location session process at the serving LC.

5. The method of claim 4, further comprising:
    transmitting, after receiving the location information terminate message at the serving LC, a location information ACKnowledgement (ACK) message representing that the serving LC normally receives the location information terminate message from the serving LC to the LS.

* * * * *